Sept. 12, 1933.     L. S. HARRISON     1,926,901
ELECTRIC TIME SYSTEM
Filed Nov. 14, 1929    10 Sheets-Sheet 1

FIG. I.

Sept. 12, 1933.  L. S. HARRISON  1,926,901
ELECTRIC TIME SYSTEM
Filed Nov. 14, 1929  10 Sheets-Sheet 2

Sept. 12, 1933.        L. S. HARRISON         1,926,901
              ELECTRIC TIME SYSTEM
           Filed Nov. 14, 1929      10 Sheets-Sheet 3
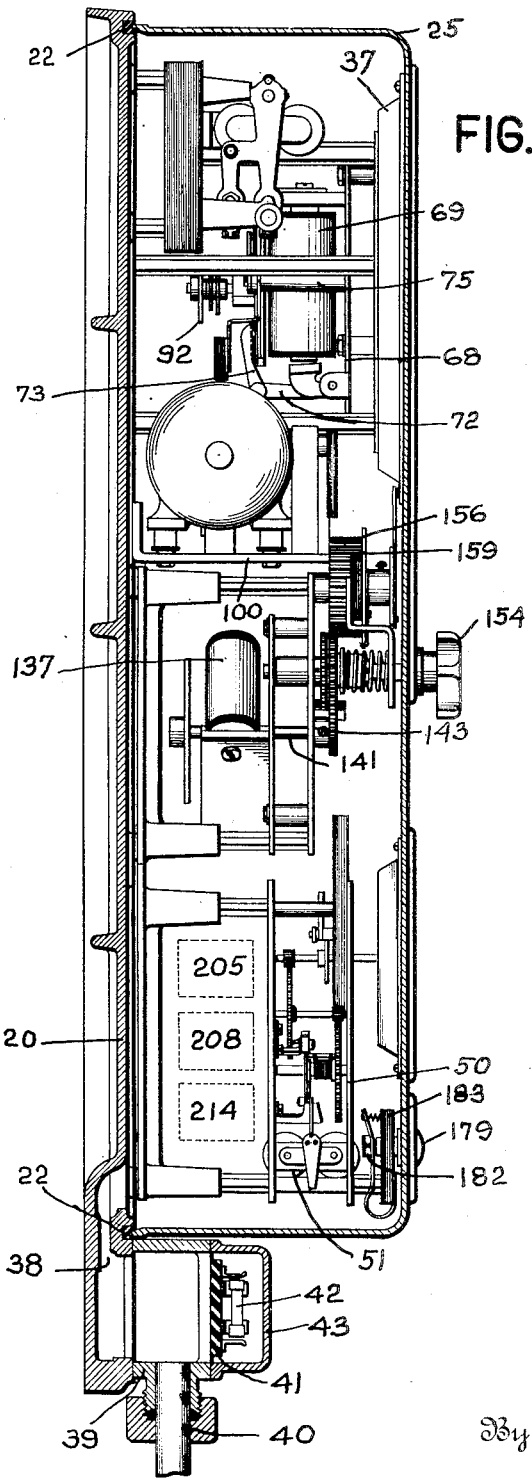
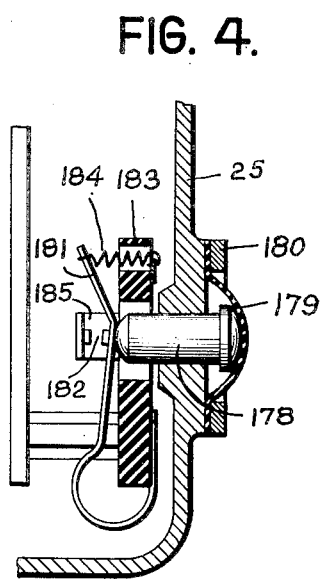
Inventor
Lawrence S. Harrison
By his Attorney

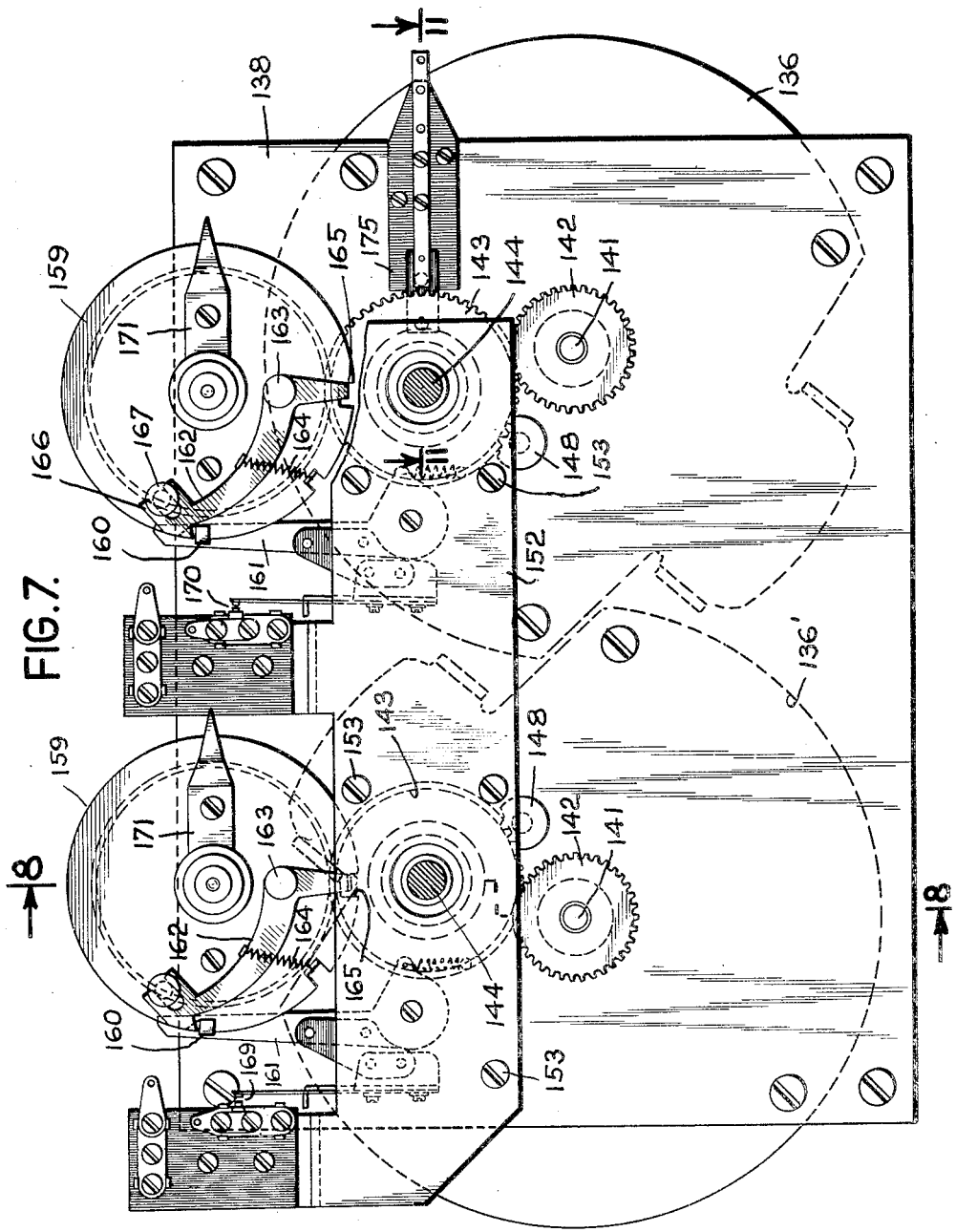

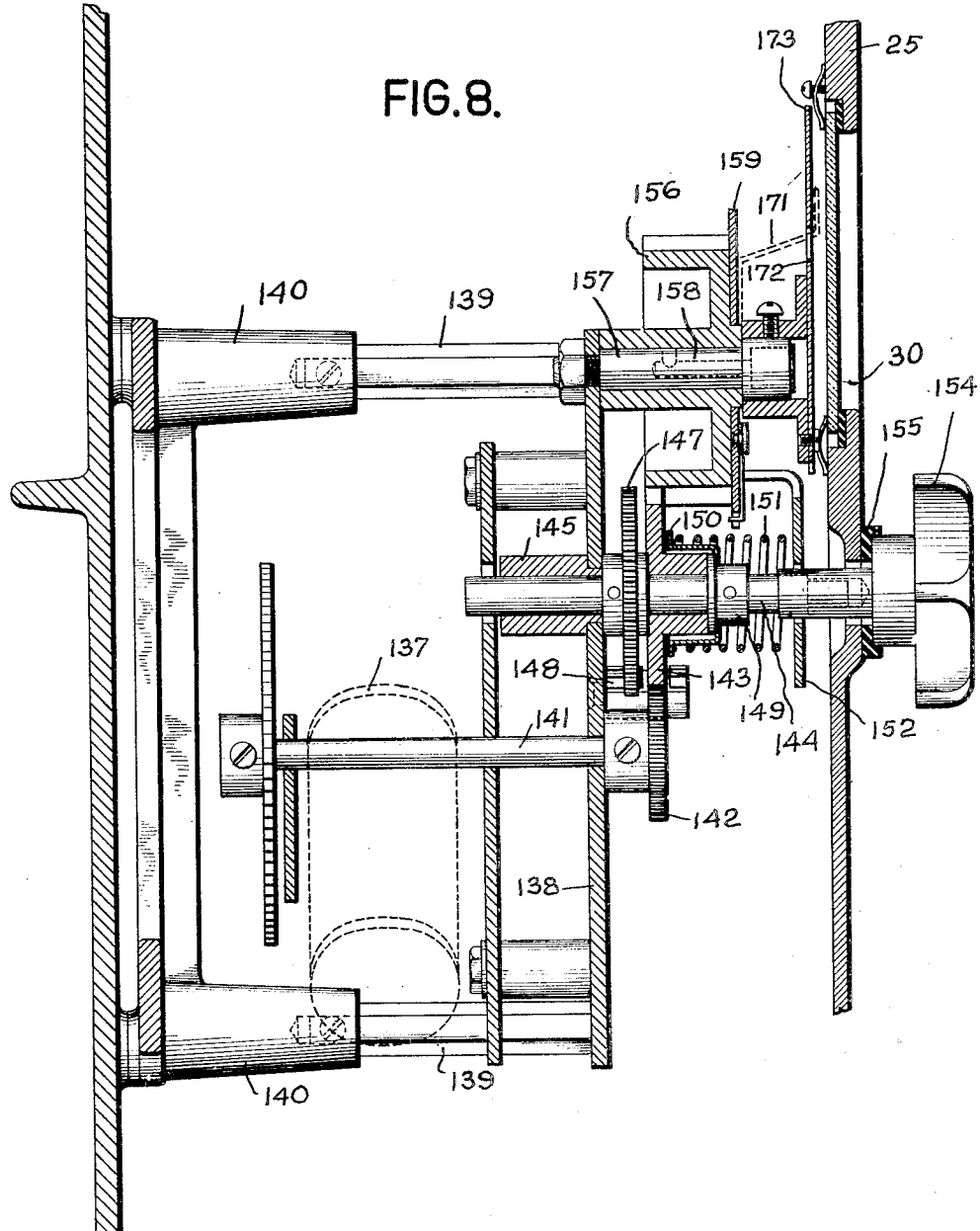

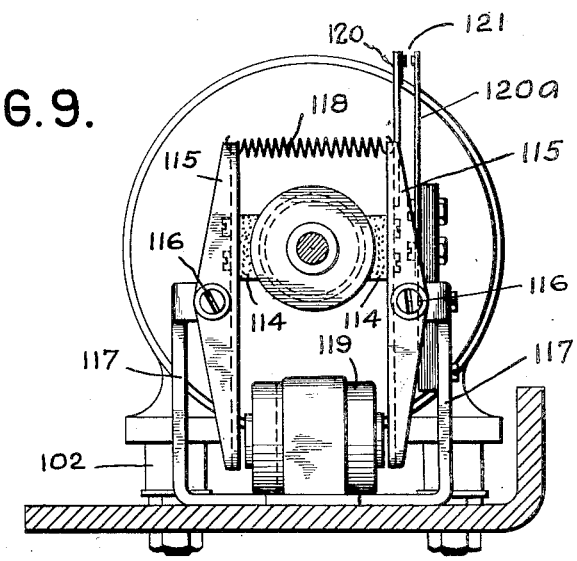
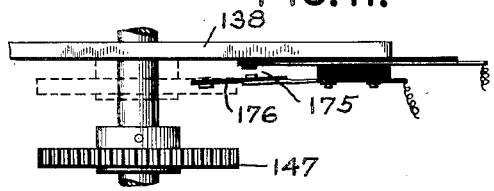
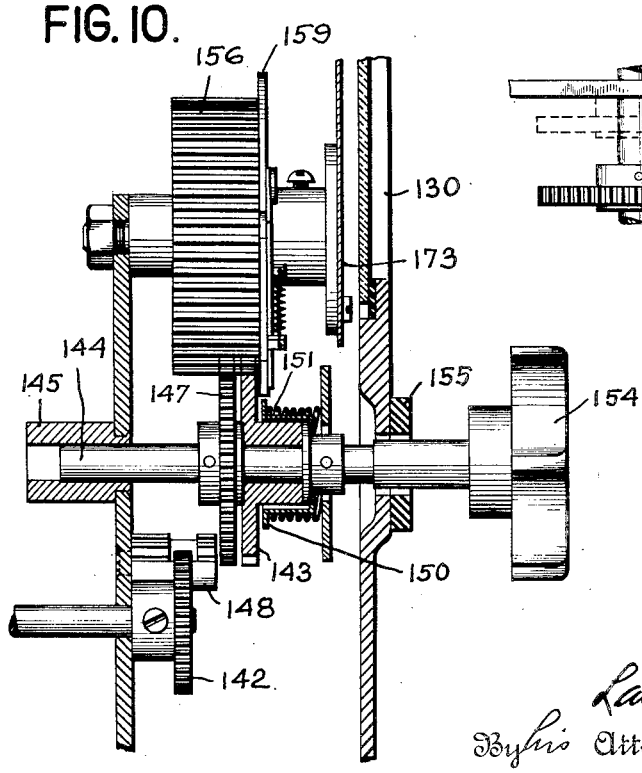

Patented Sept. 12, 1933

1,926,901

UNITED STATES PATENT OFFICE

1,926,901

ELECTRIC TIME SYSTEM

Laurence S. Harrison, Evanston, Ill., assignor, by mesne assignments, to International Business Machines Corporation, New York, N. Y., a corporation of New York Application November 14, 1929
Serial No. 407,232

6 Claims. (Cl. 58—24)

This invention relates to electric time systems and more particularly to electric self-synchronizing systems adapted for marine use. The use of electric clock systems on ships has long been a problem due to the many unusual conditions to be met, particularly on trans-oceanic ships that are crossing the meridians day after day. It is very desirable to have clocks located at convenient spots throughout a ship both in the interior and out on the decks to keep the personnel of the ships informed of the correct time to the end that the routine of the ship's day to day program may proceed in an orderly and efficient manner. Heretofore clocks on shipboard have been sparsely used due to the trouble entailed in manually setting them, and particularly the trouble encountered in setting those clocks that may be enclosed in weathertight cases.

The use of the ordinary type of minute impulse equipment has not answered this problem because it is well known that the secondary clocks on a system of this type are prone to miss an impulse now and then due to dirty contacts or line interferences and although such systems are provided with stepping keys for advancing the system as a whole it has been proven that the manual manipulation of this step key has been the most prolific source of secondary units scattering, a term used in the art for a variation of time in clocks on the system. The use of a self-synchronizing time system is quite obviously the solution of this problem but up to the present such systems have required the use of many controlling switches in the master clock to accomplish the rapid stepping up of those clocks which are slow and the retardation of those clocks which are fast. These switches have always been operated by a powerful pendulum timed master unit. The nature of marine work absolutely prohibits the use of pendulum escaped clocks due to the motion of the ship and therefore necessitates the use of clocks timed by marine or lever escapements.

To produce accurate time a finely adjusted and balanced chronometer is required. It, however, is impractical to substitute such a chronometer in place of the usual master clock because of the load that would be imposed on it by the numerous switches necessary for the proper operation and control of a self-synchronizing system. Furthermore, on ships that are sailing east or west crossing the meridians each day it is necessary to advance or retard the clock systems in accordance with the time meridians. Heretofore no automatic presetting device has ever been supplied wherein a change of time in the system could be automatically adjusted by a single setting of the control. In the case of existing straight impulse time systems the stepping keys have had to be manipulated manually for each impulse and in the case of self-synchronizing systems a "step ahead" key has had to be thrown which starts to impulse the system ahead while the operator stands by and either counts the impulses or observes a pilot secondary unit so that he can open said switch when the system has been advanced sufficiently. If the system is to be retarded it must be stopped the required amount to be set back and the operator must be diligent to be on hand to start said system when the desired amount of time has elapsed. In the applicant's invention, one setting only is made according to the amount of time the system is to be advanced or retarded, upon which setting the system automatically adjusts itself without further attention from the operator.

It is therefore one object of this invention to provide a new and useful means of controlling an electrical self-synchronizing system.

Another object is to provide means including an accurate chronometer for operating a self-synchronizing system with the use of only one contact attached to said chronometer.

Still another object is to provide mechanisms for controlling the self-synchronization of an electric time system which are operated by a single contact in a chronometer.

A still further object is to provide means for stepping ahead a clock system any desired amount by a single setting of said means.

Another object is to provide means for stopping a clock system for a definite period by a single setting of said means.

Another object is to provide means for automatically starting the operation of an electric clock system at the termination of a predetermined period during which said system is not operating.

Other objects and advantages of this invention will be apparent from the specification and the accompanying drawings which show one embodiment of this invention and wherein similar reference numerals indicate similar parts and wherein in the drawings, Fig. 1 shows the front elevation of the weatherproof and water-tight casing that houses the control mechanisms for the clock system.

Fig. 3 shows a side elevation of the control mechanisms with one side of the housing cut away.

Fig. 4 shows detail construction of manual stepping mechanism.

Fig. 7 shows details of the setting ahead and set back mechanisms.

Fig. 8 shows a section taken on line 8—8 of Fig. 7.

Fig. 9 shows a section taken on line 9—9 of Fig. 5.

Fig. 10 shows a detail section of one of the setting mechanisms of Fig. 7 in a position to be set.

Fig. 11 shows a detailed view looking in the direction of the arrows 11—11 of Fig. 7.

The invention is directed toward accomplishing the objects previously mentioned by providing an accurate chronometer which operates a single light contact once each minute to produce an electrical impulse each minute. The sole purpose of this chronometer is to emit these impulses in correctly timed regularity and for this reason will hereinafter be termed an "emitter".

Other switches required for the proper functioning of the self-synchonizing system are controlled by an electric impulse driven unit which is operated from the impulses from the emitter. This impulse driven unit will hereinafter be termed the "master control unit" as it determines which lines shall receive impulses from the emitter and also controls the operation of the device which sends out the rapid impulses, this device being operated by an electric motor. In addition to these units there are two manually set mechanisms for the purpose of resetting the entire system, one for setting the system ahead and the other for setting it back. One of these mechanisms will be termed the "set ahead control" and the other the "set back control". A person by merely setting one of these mechanisms at the proper position as shown by indicators thereon, may leave them at once and be assured that the system will be automatically set ahead or back (in accordance with which one he set) the amount of time for which he set it.

Figure 1:
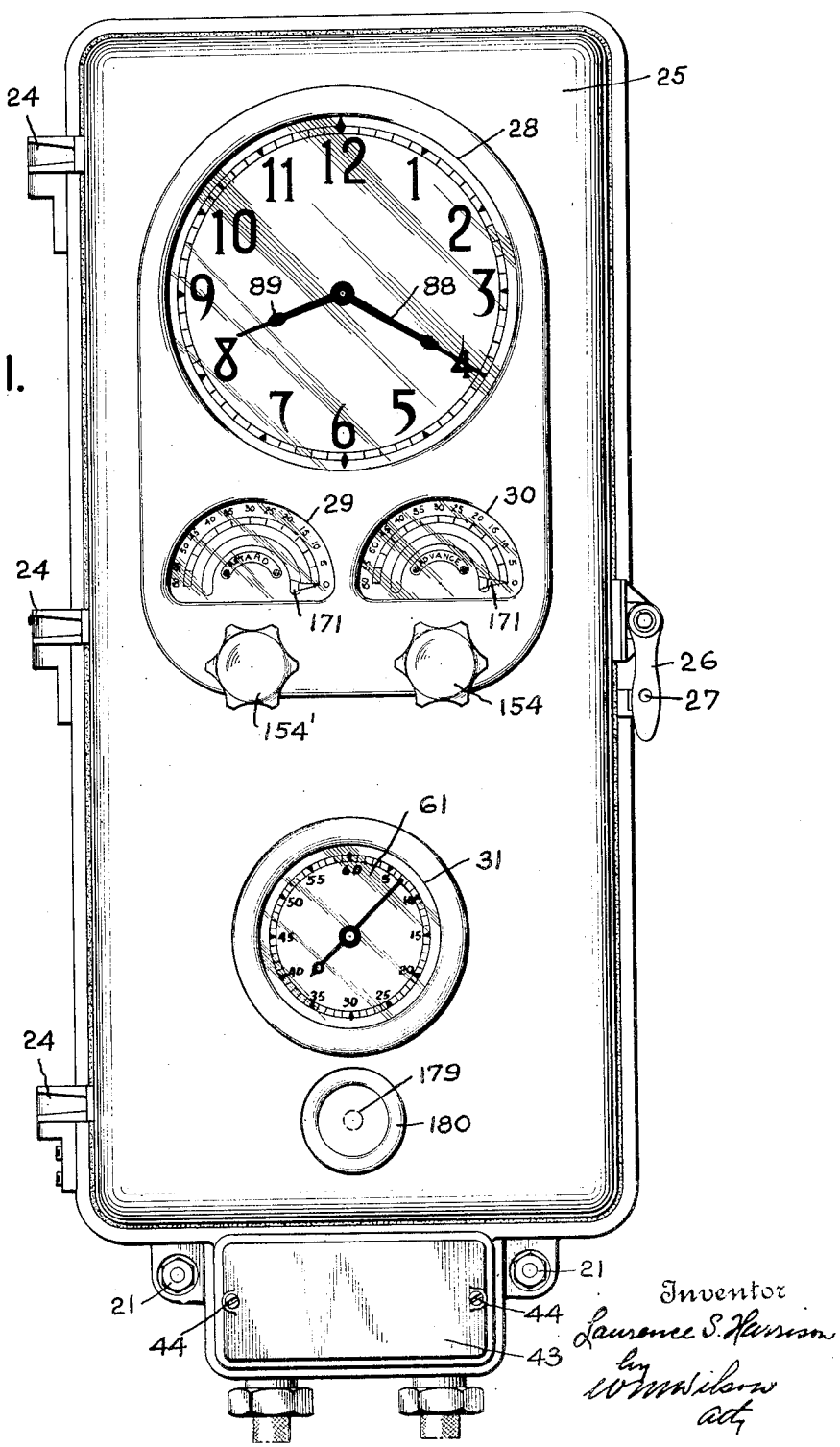
Figure 2:
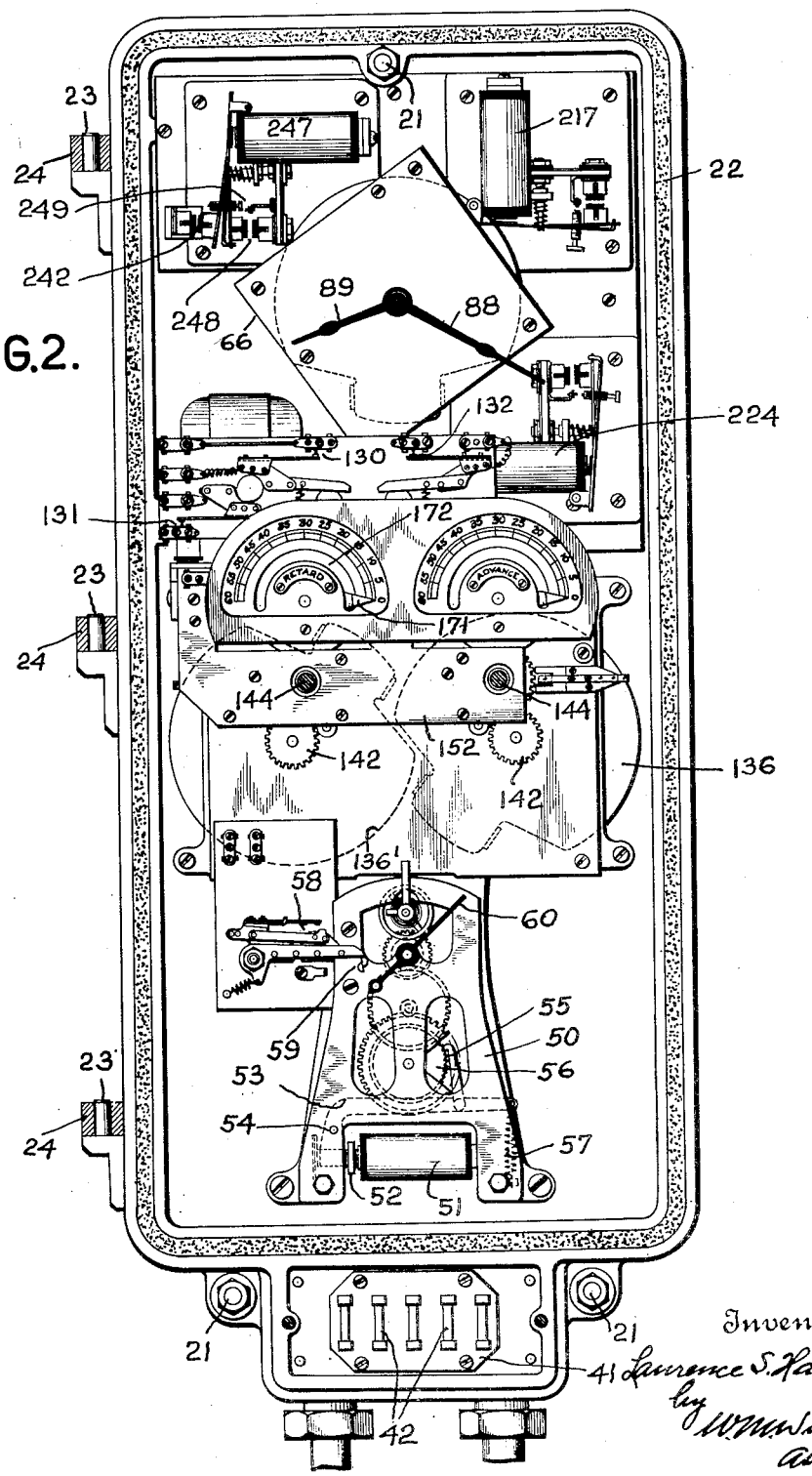
Fig. 2 shows the control mechanisms mounted on an insulated panel on the housing base with the housing cover removed.
Figure 13:
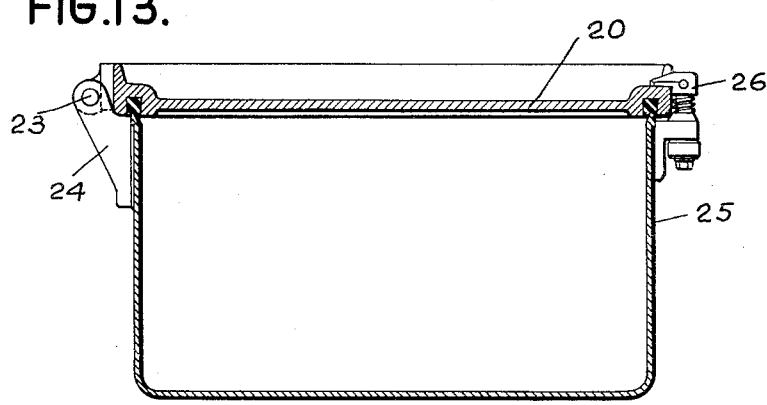
Fig. 13 shows a cross section of the water-tight housing.
Figure 14:
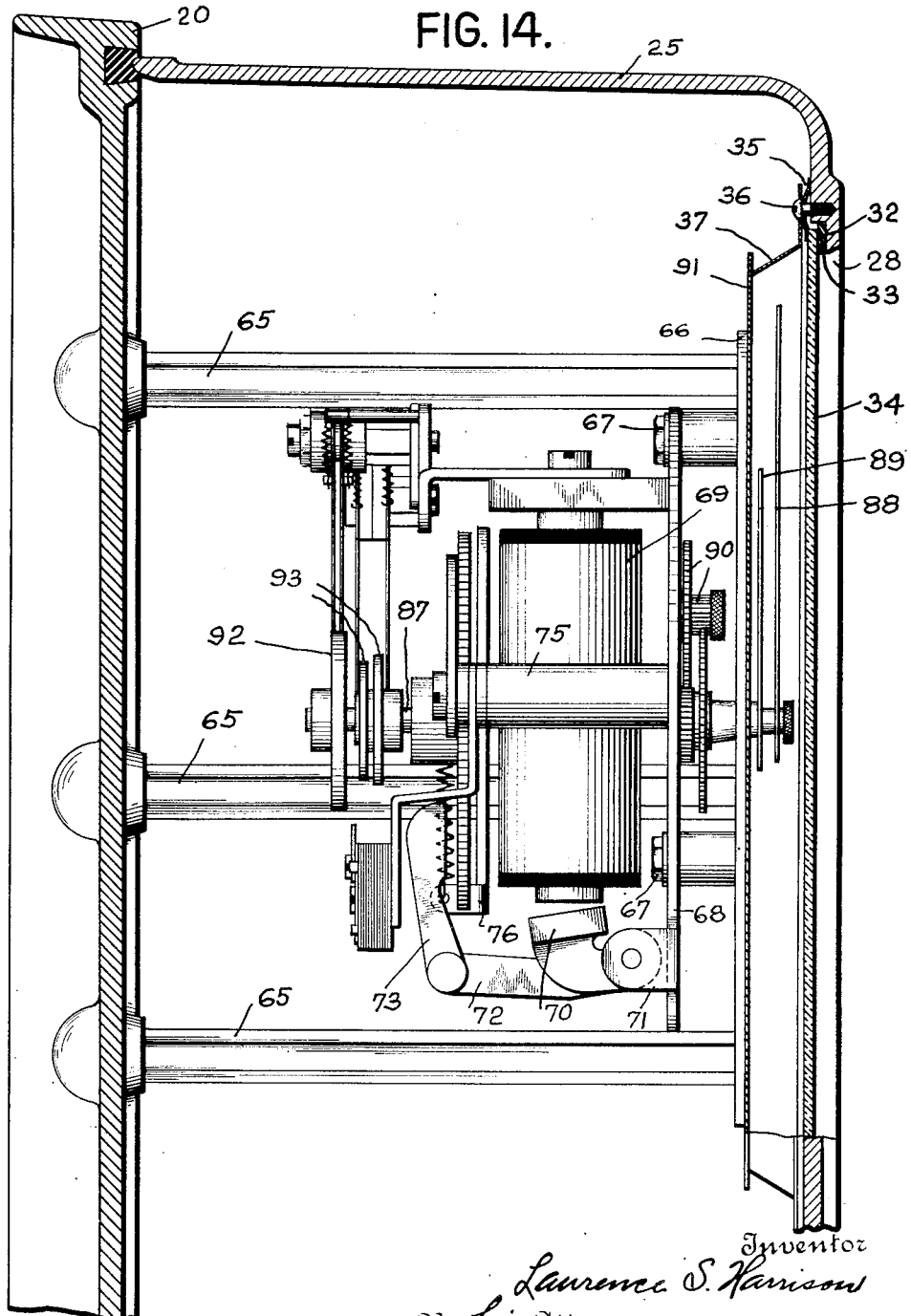
Fig. 14 shows details of mounting and a side elevation of the master control unit.

A weather-proof and water-tight case of suitable corrosive resisting material may be provided. In the present embodiment such a case is shown in Figs. 1, 2 and 3 consisting of back or base plate 20 having provisions to be mounted on a wall by bolts 21 and having a groove around the outer edge which is filled with suitable water-proof packing 22. Fixed to the sides of this base are three pintles 23 which cooperate with three eye members 24 fixed to a cover 25 to form a hinge on which said cover may swing out from the base 20. The cover 25 may be made of the same or similar material as the base 22 the edges of which conform with the packed groove 22 so that when said cover is swung and clamped against the base the edges will be embedded tightly into the packing as shown in Fig. 13. A suitable clamp 26 may be provided for fastening the cover tightly against the base said clamp being provided with means such as a hole 27 for locking with a padlock or other suitable device. The cover may be provided with four openings 28, 29, 30 and 31 in which are mounted protection glasses. The method of mounting each of these glasses is the same, two of which are shown in detail in Figs. 8 and 14. The one in Fig. 8 being the glass in the opening 30 and the one in Fig. 14 being the glass in the opening 28. For the sake of simplicity only the mounting as shown in Fig. 14 will be described in which an annular recess 32 is provided. A packing ring 33 is provided in said recess abutting which is the protection glass 34 said glass being held firmly against the packing ring by means of a plurality of clips 35 spaced at intervals around the opening and held by screws 36. A dial ring 37 is provided for openings 28 and 31 only and is also fastened to the cover 25 by the screws 36. Other openings are provided in the cover for reasons to be explained later. Integral with the base plate 20 and extending below the cover 25 is an extension provided with an opening 38 (Fig. 3) which extends through the base plate and emerges again in a portion of said base plate normally covered by the cover 25.

This opening below said cover is covered by a box-like structure 39 fixed to the base 20 having provisions integral therewith for receiving and holding in a water-tight manner a wire cable such as indicated at 40. The housing formed by the box-like structure and the base serving as a junction box for the meeting of the wiring from within the case and that from without. Mounted on this box-like structure is an insulating panel 41 which carries a plurality of renewable fuses 42 and covering these fuses is a cover 43 (Figs. 1, 2 and 3) fastened to the box-like structure by screws 44. This cover is independent of the cover 25 and may be removed without disturbing the latter for the purpose of testing or renewing the fuses.

The emitter may be any suitable chronometer provided with a lever type of escapement, preferably one which is automatically wound. In the present embodiment such a clock movement is indicated generally by the reference numeral 50 (Fig. 2). This chronometer is mounted on the base 20 and is provided with a magnet 51 mounted to the supporting plates of the movement. This magnet receives an electric impulse each minute which causes its armature 52 to be attracted to the pole face of the magnet, thus causing an arm 53 attached thereto and pivoted at 54 to be rocked counterclockwise so that the pawl 55 pivoted to the arm 53 and spring-pressed against a ratchet wheel 56 is raised and engages the teeth of said ratchet wheel. At the deenergization of the magnet the ratchet wheel 56 is turned in a clockwise direction from the downward movement of the pawl 55 caused by the biasing action of the spring 57 attached between the framework of the movement and the arm 53. The periodic turning of this ratchet winds a spring the power from which is transmitted through a suitable train of gears to the lever escapement. A more detailed description of the operation and benefits of this type of winding mechanism may be found in the application to E. F. Geiger, Serial No. 393,195, filed September 17, 1929.

As previously explained the function of the emitter is to send out accurately timed minute impulses which serve as a basis for the time keeping quality of the whole system. To accomplish this there is provided a contact 58 of the well known two finger type said contact assembly being mounted on an insulating block fixed to the movement. The contact fingers coact with a cam 59 suitably geared to the time train of the movement so as to make one revolution every two minutes. There being two high spots on the cam diametrically opposed, the contacts are closed twice for each revolution of the cam for short impulses or one each minute. A second hand 60 is mounted on an extended shaft which makes one revolution per minute and registers with a dial 61 (Fig. 1) for convenience when setting or adjusting the system.

Figure 12:
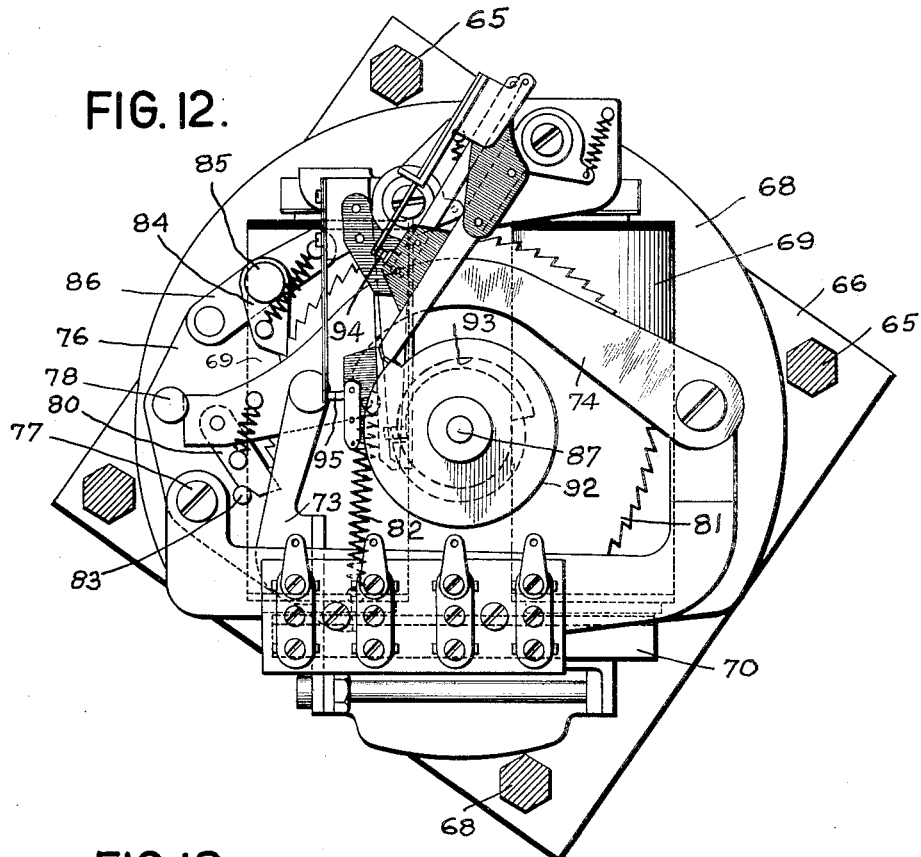
Fig. 12 shows the drive mechanism and control switches of the master control unit.

The preferred form of this invention as shown and described in this specification is directed to the operation of a self-synchronizing system such as is shown and described in the patent to J. W. Bryce, No. 1,687,491, dated October 16, 1928. This type of system requires the use of three transmission lines one of which is cut out of circuit for a definite period each hour, during a part of this time a series of rapid impulses are sent over the other transmission line. To accomplish this it is necessary to have timed switches for cutting the transmission line out of and into circuit and to control the series of rapid impulses. These switches are controlled by the master control unit which may consist of a suitable minute impulse driven unit of very substantial construction and positive in operation as shown in Figs. 12 and 14, this unit being mounted on the base 20 by means of studs 65 which support a plate 66 on which is mounted by means of screws 67 a plate 68 which supports a pair of magnets 69 and a coacting armature 70 pivotally mounted on struck-up portions 71 of the plate 68. Integral with the armature 70 is an arm 72 having pivotally connected at its end a twisted link 73 the other end of which link is pivotally connected to an arm 74, said arm being pivotally mounted to the supporting post 75 which supports one side of a plate 76 the other side of which is supported by a post which receives the screw 77 (Fig. 12).

These last mentioned mounting posts are fixed to the plate 68. The end of the arm 74 opposite its pivotal support is slidably guided in a slot in a stud 78 mounted on the plate 76 to assure its oscillating in one plane. At this same end of said arm is pivotally mounted a pawl 80 spring-pressed against a ratchet wheel 81. The arm 74 is biased in a counterclockwise direction by a spring 82 mounted to said arm at one end and to a struck-up portion of the plate 76 at the other. This last mentioned spring holds the pawl 80 impinged tightly between a stop stud 83 and the ratchet wheel 81 thus holding the ratchet wheel locked against turning in a counterclockwise direction when the arm 74 is in the position as viewed in Fig. 12. The ratchet wheel is prevented from turning in a clockwise direction by a stop pawl 84 spring-pressed against the ratchet wheel and pivotally mounted on a stud 85 fixed to the plate 86 which is adjustably mounted to the plate 76. The ratchet wheel 81 is fixed to a shaft 87 journalled in the plates 76 and 68. At one end of the shaft is fixed a minute hand 88 and its corresponding hour hand 89 is fixed in the usual manner to a geared bushing rotatably mounted on the shaft and operated by the usual train of gears generally indicated at 90. The minute and hour hands register with a dial 91 mounted on the support plate 66 and abutting the edge of the dial ring 37 when the cover 25 is closed. At the other end of the shaft 87 are fixed cams 92 and 93, cam 93 being a double cam mounted on a common bushing. These cams coact with two sets of finger type of contact well known in the art and are for the purpose of timing the opening and closing of contacts 94 and 95 respectively. The magnets 69 receive an impulse each minute as initiated by the contact 58 of the emitter which attracts the armature 70 when said magnet is energized causing the pawl 80 to be raised sufficiently to engage the next succeeding tooth on the ratchet wheel 81. When the magnet is deenergized the pawl 80 is pulled downwardly by the spring 82 to move the wheel 81 the length of one tooth in a counterclockwise direction as viewed in Fig. 12 the movement of which is indicated on the dial 91 as an advance of one minute.

Thus this mechanism is advanced by minute impulses and the time indication may be read from the dial so that this serves as the master clock for the electric time system and is a companion time unit for checking the time keeping qualities of the secondary units. This unit being mounted in the same case with the emitter and practically adjacent to it is not subject to interferences from line trouble and therefore readily keeps in proper time relation from the impulses initiated by the emitter.

The contact 94 actuated by cam 92 is timed to close for one minute during the hour, closing at the break of the 58th minute impulse, remaining closed during the 59th minute impulse and opening at the break or termination of the 59th minute impulse. The closing the contact 94 causes the 59th minute impulse to start a mechanism which sends out a series of rapid impulses during the interval between the 59th and 60th minutes. The circuit and manner of starting this mechanism will be described later.

Figure 5:
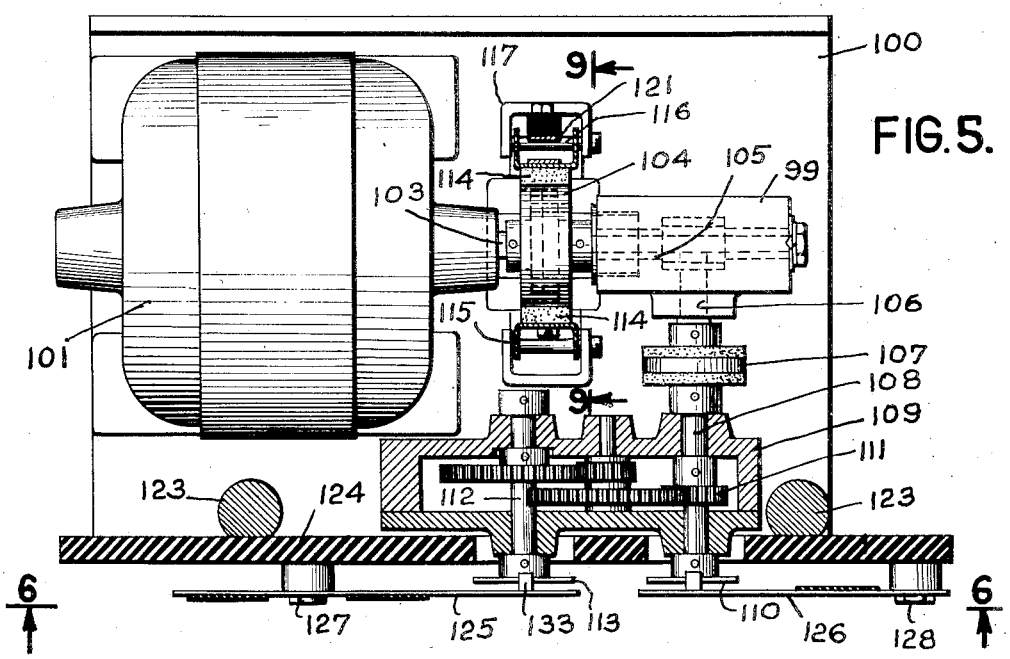
Fig. 5 shows a detail plan view of the rapid impulse sending mechanism.
Figure 6:
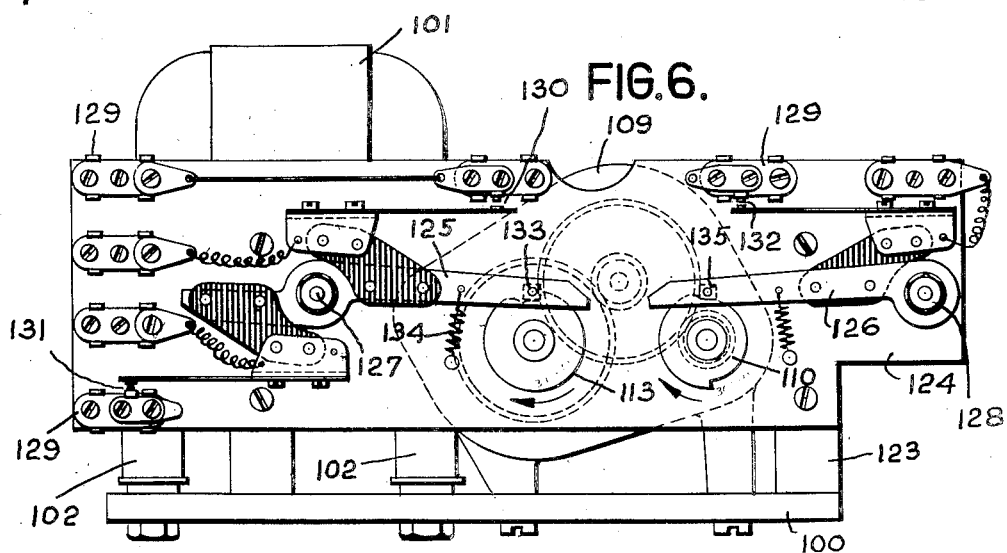
Fig. 6 shows the front elevation of Fig. 5 taken along lines 6—6.

The mechanism for initiating the series of rapid impulses is supported on a shelf 100 fixed to the back plate 20 and may consist of an electric motor 101 mounted on washers 102 of material suitable to minimize any noise of vibration that may be produced by the motor while running, (Figs. 5, 6 and 9). The armature shaft 103 which is extended has affixed thereto adjacent the bearing a brake drum 104 and the end of said shaft has a worm cut thereon, said shaft extending into a housing 99 and journalled in said housing. The worm cut portion for said shaft engages with a worm wheel 105 fixed to a shaft 106 also journalled in the housing 99 and extending from the housing at right angles to the shaft 103. The housing 99 is supported on the shelf 100 and is suitable for retaining a lubricant in which the worm and gear may run. At the end of the shaft 106 is a coupling 107 joining said shaft with another shaft 108 journalled in a housing 109. Said shaft extends through the housing with its opposite end emerging and having a cam 110 fixed thereon.

Within the housing there is fixed to said shaft a gear 111 which through engagement of a gear train causes a shaft 112 to be turned when the motor turns shaft 106. The shaft 112 is also journalled in the housing 109 and extends through the housing having a cam 113 fixed thereon. The housing 109 is arranged to retain a suitable lubricant for the gear train to operate in.

Impinging against the brake drum 104 are two brake shoes 114 fixed on two supporting members 115 pivoted at 116 to a bracket 117. The upper portion of the members 115 are connected by a spring 118 under tension so that in the normal position of the mechanism as shown in its quiescent state in Fig. 9 the brake shoes are pressed tightly against the drum 104 thus keeping the brake constantly applied. The lower ends of the members 115 terminate adjacent the two opposite pole faces of an electromagnet 119 so that when said magnet may be energized the lower portion of the members 115 will be attracted to the pole faces thus rocking the brake shoes 114 away from the drum 104 and releasing the braking action. To one of the members 115 is fixed a contact spring 120, a coacting contact spring 120a being fixed to an insulated strip mounted on the bracket 117. When the electromagnet 119 is energized the oscillation of the right hand member 115 as viewed in Fig. 9 moves the contact spring 120 to the right to close the contact 121, the purpose of which will be explained later. Two supporting posts 123 fixed to the shelf 100 have attached thereto a panel 124 of suitable insulating material and on this panel are mounted fingers 125 and 126 pivoted at 127 and 128 respectively together with various terminal posts 129. Mounted on the arms 125 but insulated therefrom are contacts 130 and 131 and mounted on the arm 126 in a similar manner is contact 132. The finger 125 has a projection 133 fixed to it which rides on the cam 113 being biased by the spring 134. There is one notch on the cam 113 in which projection 133 rests when the motor is not running as shown in Fig. 6.

When in this position the contacts 130 and 131 are open and when out of this notch these contacts are closed. Said cam 113 is so geared as to make three revolutions per minute when the motor 101 is running. The cam 110 is geared to make 30 revolutions per minute when said motor is running. The finger 126 also has a projection 135 which cooperates with cam 110 in the same manner as the previously mentioned finger 125 and in such a way as to cause the contact 132 to close and open once for each revolution of the cam 110. The various contacts included in this assembly are wired to the binding posts 129 to permit their readily being connected to external circuits.

For manually advancing or retarding the clock system there are provided two electric impulse driven control units. The set ahead and set back control mechanisms are shown in Fig. 7, the one on the right being for setting ahead and the one on the left for setting back. The electric impulse drive mechanisms are of the ratchet and pawl type operated from a magnet and are identical with the driving mechanism for the master control unit shown in Fig. 12, the magnet on the set ahead mechanisms being indicated by the reference numeral 137 (Fig. 3). These mechanisms are diagrammatically shown by the outline of their mounting plates 136 and 136' and are mounted in the same manner to a plate 138 which is mounted to the base plate 20 by studs 139 removably inserted into bases 140 (Fig. 8). As the operations of the two are almost identical the general operation of the set back control will be given as applying to both with the same reference numeral designating identical parts on both mechanisms. The center shafts 141 are driven directly from the ratchet wheel and have fixed thereto gears 142 which make one revolution for 60 impulses.

The gear 142 normally engages gear 143 which is rotatably mounted on a shaft 144 journalled in a bushing 145 fixed to the plate 138.

A gear 147 is fixed to the shaft 144 and in its normal position engages a locking member 148 which prevents said gear from rotating, said locking member being provided with two teeth to engage the gear 147 and being rigidly fixed to the mounting plate 138. A collar 149 flanged on one side is fixed to the shaft 144. A spring supporting shield 150 is provided in the shape of a cylindrically formed member having inwardly turned flanges on one end which cooperate with the flanges of the collar 149 and outwardly turned flanges at the other end which abut one end of a helical spring 151, the other end of which abuts a plate 152. Said plate is mounted rigidly by means of screws 153 mounted in posts not shown, which are in turn mounted to the plate 138. The spring 151 being under tension biases the gear 143 on the shaft 144 inwardly so that the hub of the gear 147 abuts the plate 138, said shaft being slidable as well as rotatable in its bearing 145. The end of the shaft 144 projects through apertures in the plate 152 and the cover 25 and has detachably fixed to the end a hand knob 154 which knob cooperates with a suitable sealing member 155 to prevent moisture from entering through the aperture of the cover 25 when the knob is in position.

The gear 143 meshes with a gear 156 having a wide face and the gear 143 is adapted to be slid transversely across the face of the gear 156 by pulling outwardly on the knob 154 at which time the gear 147 slides outwardly and into engagement also with the gear 156, the position taken being that as shown in Fig. 10.

The gear 156 is rotatably mounted on a stud 157 bolted to the plate 138, said stud being provided with an enlarged portion at its outer end for preventing the gear from sliding off. Suitable oiling provisions are furnished as indicated by the dotted lines 158. Fixed to the gear 156 is a cam 159, said cam being provided with an indentation having one side normal to the periphery and the other side sloping. In the home position as shown in Fig. 7 a cam wiper 160 fixed to a contact carrier arm 161 rests in said indentation.

Pivotally mounted on the face of said cam is a lever 162 pivoted at 163 and biased in a counterclockwise direction by a spring 164 anchored to a struck-up piece on the cam. One end of said lever is formed over and cooperates with a notch 165 in the periphery of said cam, the sides of said notch acting as stops for limiting the amplitude of oscillations of the lever 162. The opposite end of said lever has a bifurcated projection 166 which slidably cooperates with a button 167 which serves as a guide to support the outer end of the lever 162. When the cam 159 is rotated counterclockwise the cam wiper 160 slides up the slope of the indentation pushing the lever 162 back in a clockwise direction until said cam wiper rides on the outside periphery of the cam thereby pushing the lever 162 in a clockwise direction. After the cam wiper passes this lever it returns to its home position under the influence of the spring 164 thus covering the cam action of the sloping side of the indentation so that when the cam 159 moves clockwise and the indentation approaches the cam wiper said cam wiper will ride over the edge of the lever 162, instead of descending the sloping side gradually to be seated in the indentation, and will drop abruptly off of the pointed end of lever 162 into the indentation thus causing contacts 169 or 170 to open abruptly. These contacts having one side mounted on a fixed insulating block and the other mounted on and insulated from the contact carrier arms 161 are identical in construction as are the other parts of these mechanisms previously mentioned but have been given different reference numerals to simplify the latter explanation of the wiring diagram. These contacts are normally open when the cam wipers 160 are resting in the indentations as shown in Fig. 7 which is the home position and are closed whenever the cams are out of this position.

Fixed to the face of the cams 159 are indicators 171, said indicators projecting through arcuate apertures 172 in plates 173 and cooperate with scales on the front of said plate (Figs. 2, 7 and 8). These scales are graduated from zero to sixty through an arc of one hundred eighty degrees, the sixty representing the sixty minutes in the hour. The scale is divided into increments of five minutes each which seemed the best suited for the purpose, but it can be readily seen that increments of a minute could just as easily have been provided by changing the gear ratios and the teeth to accord with such graduation. The ends of the arcuate apertures 172 may cooperate with the indicators 171 to act as limiting stops so that said indicators may not be turned more than one hundred eighty degrees. The left hand indicator and scale are designated by the word "Retard" mounted on the plate 173 and the right hand is designated by the word "Advance" both indicative of the function of the two movements, which will be explained later. The driving magnets of these two mechanisms only function after the cams 159 have been turned from their home position. By pulling the knob 154 outwardly or to the right as viewed in Fig. 10, which shows the mechanism in this position, the gears 147 and 143 are slid along the face of 156 and the gear 147 is removed from cooperation with the locking member 148 and the gear 143 is removed from meshing with the gear 142. The shaft slides in its bearing 145 and the spring 151 is compressed. The knob 154 may now be turned in a clockwise direction turning the gear 147 clockwise and the gear 156 together with the cam 159 and indicator 171 in a counterclockwise direction to any position required. The indicator 171 must be lined up accurately with the graduations of the scale before the gear 147 can pass through the teeth of the locking member 148. This assures the teeth of the gear 143 being in proper alinement to mesh with gear 142. The teeth of the locking member 148 are cut away in the plane of the gear 142 so that they will not obstruct the gear 143 when in mesh with said gear.

After the knob 154 has been released and the gears 142 and 143 have been returned into cooperation with each other by the spring 151 the magnetic drive mechanism begins to function by receiving electric impulses in a manner to be described later. This causes the gear 142 to rotate in a clockwise direction, turning the gear 143 counterclockwise about the shaft 144 and turning the gear 156 clockwise and with it the cam 159. This continues until said cam arrives at its home position permitting the contact 169 or 170 to open which stops the drive of the mechanism. The only difference in the two mechanisms just described is in the addition of an interlocking contact 175 on the set ahead control or right hand mechanism as viewed in Fig. 7. This contact which is shown in detail in Fig. 11 is a spring contact which always tends to open when unrestrained and is mounted on a suitable insulating block to the plate 138. The spring portion of the contact has a projection 176 of insulating material which extends in back of the gear 147 and when said gear is in its normal position and locked by the locking member 148 as viewed in Fig. 8, said gear presses down against the projection 176 causing the contacts 175 to remain closed. When the knob 154 is pulled out for the purpose of manually setting the mechanism, the gear 147 is moved forward permitting the contact 175 to open as shown in Fig. 11. The dotted lines in this figure indicate the position of said gear in its normal position which closes the contact. The purpose of opening this contact at such a time is to prevent the initiation of rapid impulses for setting the system ahead while the mechanism is being set.

Various relays of suitable design are mounted on the back panel of the base plate 20, the purpose of which will be described later.

A manually operated contact is provided which consists of a plunger 178 slidably mounted in an aperture of the cover 25 (Fig. 13). One end of said plunger is enlarged to prevent it going through the aperture and over this enlarged end is spread a flexible diaphragm of weather-proof and water-proof material. The edges of the diaphragm are held firmly against the cover 25 by a suitable ring 180. The opposite end of said plunger cooperates with an arm 181 which carries one side of a pair of contacts 182. This arm is mounted on an insulating block 183 which is in turn mounted on the front plate of the emitter. The arm 181 is biased by a spring 184 which normally holds the contacts 182 open. The other side of the contact is mounted on a bracket 185 which is in turn mounted on the insulating block 183. Pressure exerted on the end of the plunger causes the contacts to be closed the diaphragm 179 flexing to accommodate the movement yet at all times excluding moisture from the aperture.

Figure 15:
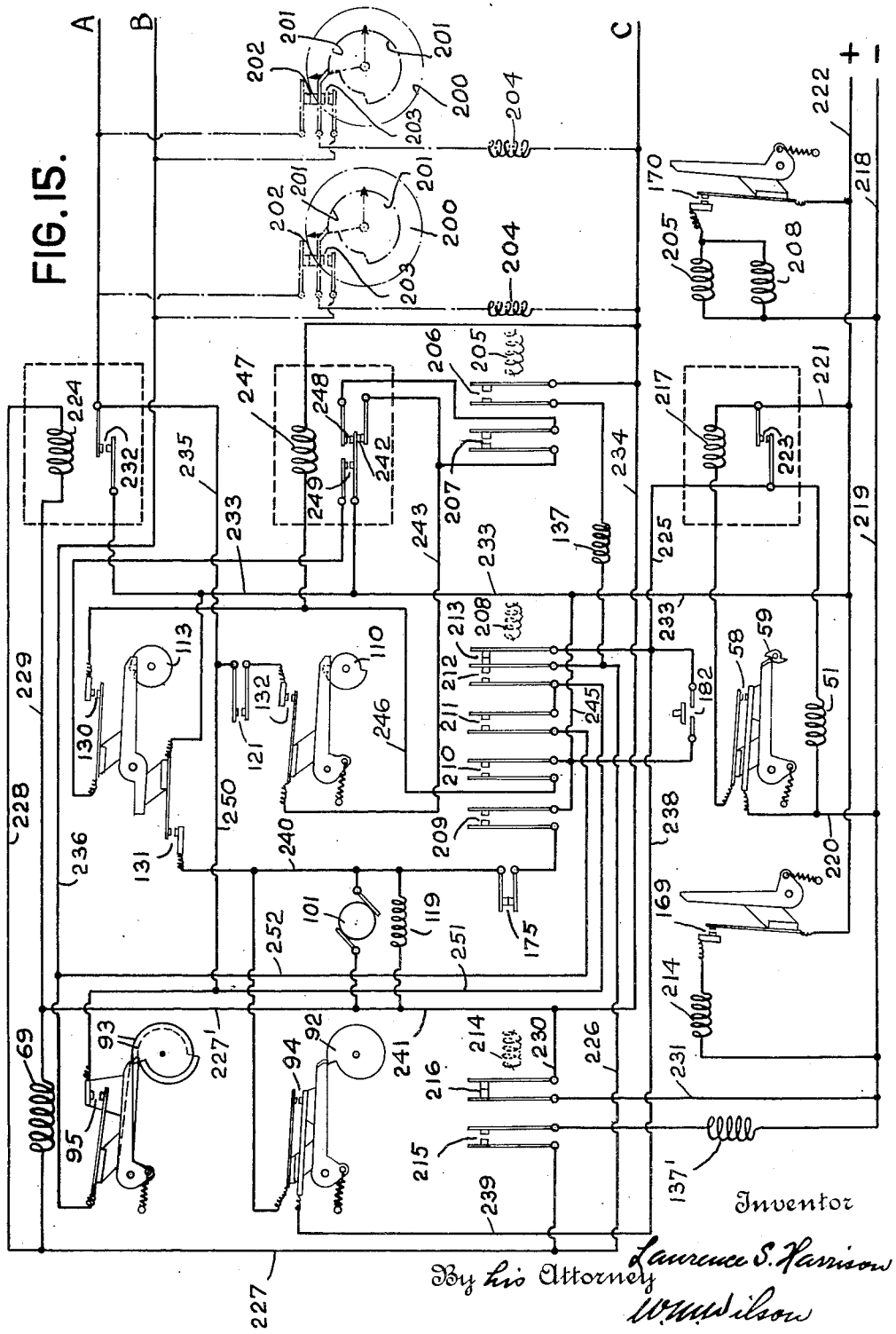
Fig. 15 is a wiring diagram of the control mechanisms.

Fig. 15 shows the wiring layout of the circuits of the control mechanisms shown in Fig. 2 together with an outside circuit including one secondary unit. The secondary movement generally indicated at 200 may be one of a plurality of such units having a cam 201 controlling contacts 202 and 203 said cam being driven by a ratchet pawl mechanism actuated by a magnet 204 which is energized by impulses transmitted over selected groups of the three wires A, B and C according to the action of the control clock in conjunction with the contacts 202 and 203. The general design of secondary clock as well as the self-synchronizing action of the secondary units on this three wire system is fully shown and described in the patent to Bryce #1,687,491, dated October 16, 1928 and therefore no further description of the secondary units are deemed necessary.

In the control circuits there are three relays used for controlling groups of contacts. These relays may be of any desired design and are diagrammatically shown in their preferred form in which relay magnet 205 when energized closes the normally opened contacts 206 and 207. Relay magnet 208 when energized closes the normally opened contacts 209, 210, 211, and 212 and opens the normally closed contact 213. Relay magnet 214 when energized closes the normally opened contact 215 and opens the normally closed contacts 216.

The cam 59 being constantly rotated by a chronometer mechanism closes the contact 58 of the emitter once each minute thereby closing a circuit for the relay coil 217 as follows: from the negative supply line 218, through lines 219, 220, contact 58, relay magnet 217, line 221 and back to the positive supply line 222. The relay magnet 217 being thus energized each minute closes its normally opened contact 223 thus sending an impulse each minute through the winding magnet 51 for keeping the emitter wound. This circuit is from the positive supply line 222, line 221, relay contact 223, winding magnet 51, lines 220 and 219 to the negative supply line 218. The closing of the relay contact 223 each minute energizes the driving magnet 69 of the master control unit and the relay magnet 224, both of which magnets are connected in parallel with each other, through the following circuits: from the positive supply 222, through line 221, contact 223, line 225, contact 213 now closed, lines 226 and 227, driving magnet 69, and at the same time through line 228, relay magnet 224, line 229 to line 227', line 230, contact 216 now closed, lines 231 and 219 to the negative supply line 218. The impulsing of the driving magnet 69 causes the cams 93 to be rotated in such a manner to cause contact 95 to close at the break of the 60th minute when the hands of the master control unit advance to the 60th minute after the hour. Cam 92 is also rotated in the same manner to cause contact 94 to be closed at the break of the 58th minute impulse and to open at the break of the 59th minute impulse, thus when the 59th minute impulse is initiated it will pass through the contact 94 then closed in a manner to be described later.

The contacts controlled by the cam 201 in the secondary units are timed so that contact 202 opens and contact 203 closes when the secondary advances to indicate the hour and contact 202 closes and contact 203 opens when the secondary next indicates fifteen minutes after the hour. When contact 95 is closed, minute impulses are transmitted over both the A and B wires by the closing of relay contacts 232 which are closed each time the relay magnet is energized as previously described, said minute impulses being conducted over wire A or B and through the secondary unit driving magnet 204 to the common return wire C according to which one of the contacts 202 or 203 are closed. When the contact 95 is opened, the minute impulses initiated by the closing of relay contact 232 may only be transmitted only over the A wire. This last named circuit is as follows: from positive supply line 222, through line 233, relay contact 232, line A, contact 202, when closed, secondary drive magnet 204, line C, lines 234 and 230, contact 216, lines 231 and 219 to negative supply 218. For transmitting the impulses over the B wire the circuit from the positive supply 222 to the relay contacts 232 is the same as just previously explained and from said relay contact proceeds over line 235, contact 95 when closed, line 236, line B, contact 203 when closed, and back through the common return wire C to the negative supply 218 as previously explained.

In the usual operation of the system with the presetting devices inactive the self-synchronization of the secondary units with the master section is accomplished along the lines disclosed in Bryce's Patent No. 1,687,491 previously mentioned in which normal minute impulses are transmitted at all times along the A wire and in which the contacts 202 controlled by the chronological position of the secondary units opens when the secondary unit indicates the even hour at the same time closing contact 203 thus transferring the secondary driving magnets from the A wire to the B wire.

The control mechanism is timed to open the B wire connections by opening contact 95 at the half hour so that no impulses are transmitted over said B wire. Thus if such secondary units that are fast will reach the hour position as indicated by them in advance of the master control mechanism and will be transferred to a dead line and will therefore be halted until the minute impulses are sent through the B wire which will be on the first minute after the hour due to the contact 95 closing at the break of the 60th minute impulse. A series of rapid impulses are sent out over the A wire between the 59th and 60th minute due to the closing of contact 94 so that all secondaries that are slow will be connected with the A wire and will be advanced until they are in synchronism with all secondaries on the line at which time they transfer themselves from the A wire to the B wire in readiness to start off in unison when the first minute impulse after the hour is transmitted over the B line. As all of these magnet driven ratchet and pawl mechanisms advance at the break of the impulse when the driving magnets deenergize, the contact 94 is timed to close at the break of the 58th minute. When the 59th minute impulse is initiated a circuit is completed from the positive supply 222, through line 221, relay contact 223, lines 225, 238, 239, contact 94, line 240, motor armature 101 and brake magnet 119 in parallel with said armature, lines 241, 230, contact 216, lines 231 and 219 to the negative supply 218. The duration of this impulse is about two seconds at the termination of which the cam 92 advances to cause contact 94 to open. During the two seconds, then, current flows through contact 94 and motor armature 101 starting said motor to rotate thereby causing rotation of the cam 113 which immediately causes its coacting contacts 130 and 131 to close. The closing of contact 131 takes the control of the motor 101 from the contact 94 and causes said motor to continue to rotate as long as said contact 131 remains closed. The circuit effecting this is from the positive supply line 222, line 233, contact 131, line 240, motor armature 101, lines 241, 230, contact 216, lines 231, to negative supply line 218.

As previously mentioned, brake magnet 119 being in multiple with motor armature 101 causes the brake on the armature shaft to be released as long as current is flowing through said armature. The closing of contact 130 has no effect on the regular hourly synchronizing period. The energization of brake magnet 119 causes contact 121 to close and therefore causes contact 132 to be brought into circuit. The cam 110 is geared to motor shaft and is timed to make 30 R. P. M. and the cam 113 is timed to make 3 R. P. M. The cam 110 therefore causes contact 132 to close 30 times a minute thus sending out impulses at the rate of one every two seconds when said cam is rotating. These rapid impulses are transmitted over the wire A as follows: from positive supply line 222 through line 233, relay contact 242, wire 243, contacts 132 and 121, line 235 to the A wire, through the drive magnets 204 of those secondaries which have their corresponding contacts 202 closed, and back through the common return wire C as previously explained. Rapid impulses therefore are sent out until the cam 113 makes one revolution and again opens contact 131 which breaks the motor circuit and permits the brake to reset stopping the motor immediately, the contact 94 having previously broken. On the minute impulse occurring after the completion of the rapid impulses the contact 95 closes which is at the break of the 60th minute impulse. All secondary clocks having been synchronized to even hour and transferred to the B wire are in a position to advance when the impulse for the first minute after the hour is transmitted over the B wire as follows: from positive supply 222 through relay contact 232 as previously described, line 235, 250 contact 95, line 236, to the B line and through the secondary drive magnets back to the negative supply 218 as described.

The foregoing has described how the B wire is opened for a predetermined period to affect secondary clocks that are fast, how rapid impulses are sent over the A wire to affect secondary clocks that are slow, and how minute impulses are transmitted for the normal operation of the system. The manner in which the system as a whole may be set forward or back due to change in the standard time will now be described.

Let it be assumed that it is desired to set the system ahead 15 minutes, the knob 154 on the "set ahead" control (Figs. 1 and 10) is pulled outwardly and then turned in a counterclockwise direction until the indicator 171 registers with 15 on the dial. As previously explained, the pulling outwardly of said knob causes contact 175 to open and the counterclockwise operation of the mechanism causes the contact 170 to close (Fig. 15). The closing of this last named contact energizes relay magnets 205 and 208 through the simple circuit as clearly outlined in Fig. 15. The energization of said relay magnets causes contacts 209, 210, 211, 212, 207 and 206 to be closed and contact 213 to be opened. When the knob 154 is located at the proper place by 15 on the dial it is restored inwardly which causes contact 175 to close and establish a circuit through the motor armature 101 and brake magnet 119 as follows: positive supply 222, lines 233 and 245, contact 209, now closed, contact 175, motor armature 101 and brake magnet 119, lines 241 and 230, contact 216, line 231 to negative supply 218. The closing of contact 210 establishes a circuit from the positive supply 222, lines 233 and 245, contact 210, line 246, relay magnet 247, line 234, contact 216, to the negative supply 218. The energization of relay magnet 247 thus causes contacts 248 and 249 to close and contact 242 to open. The motor now having been actuated as previously explained impulses at two second intervals are initiated by the contact 132 as follows: from positive supply 222, line 233, relay contact 248, contact 207 (now closed) line 243, contacts 132 and 121, line 235 to the A wire; also from contact 132, contact 121, lines 250, 251, contact 211 now closed, lines 252 and 236 to the B wire, thence from the A and B wires through the driving magnet 204 of the secondary units to the C wire and back to the negative supply line 218 as previously described.

These impulses initiated by the operation of contacts 132 are also transmitted from these contacts through contact 121, lines 250 and 251, contact 212, now closed, lines 226 and 227, master control drive magnet 69, line 227', line 241, contact 216 to the negative supply line 218, thus advancing the master control in unison with the secondary system; and likewise impulses from contact 132 are transmitted over the same circuit through contact 212 and thence through the "set ahead control" drive magnet 137, contact 206, now closed, line 234, contact 216, to the negative supply line 218. The magnet 137 therefore, receives each impulse that is transmitted to the A and B wires and thus steps the "set ahead control" unit in a clockwise direction until its indicator registers with the zero position on the dial at which time the contact 170 is opened, thus deenergizing relays 205, 208 and restoring the plurality of contacts controlled by them to their normal position halting the transmission of the rapid impulses and restoring the system to its normal self-synchronizing operation. The number of impulses required to return the "set ahead control" to zero will be the same number desired to set the system ahead as indicated by the setting of this control; thus when the indicator was set at 15 to advance the system 15 minutes, the control will be restored to zero at the break of the 15th impulse. Contacts 213 are opened during this setting ahead process to open the circuit from relay contacts 223 to the clock system so that there will be no interference with the rapid impulses by the closing of said contact 223 each minute. The opening of contact 213 also opens the circuit from the manual stepping key 182 to prevent any interference from this source. As the motor 101 will continue to rotate as long as contact 131 is closed it can be readily seen then that it can only be stopped when the cam 113 is in its home position, the only position at which control 131 may open. In the above cited example in which 15 impulses only are desired the cam 113 will have turned one and one-half revolutions so that when the final impulse is sent out it will still have another half revolution to travel before reaching its home position to stop the motor.

During this one-half revolution of travel the contact 132 will open and close five times sending out five additional impulses not desired. These superfluous impulses are rendered ineffective by the opening of the contact 207 when the "set ahead control" unit reaches its zero position at the end of the 15th impulse in the example described. With this contact open the only other means of transmitting impulses from the closing of contact 132 is through the relay contact 242 as explained in connection with the normal self-synchronizing operation of the system. Relay contact 242 is held open however until the cam 113 reaches its home position opening contact 130. As previously explained, the relay magnet 247 is energized when contact 210 closes at the setting of the "set ahead control" unit. This causes the relay interlock contact 249 to close and as the motor starts cam 113 to rotating the contact 130 closes, completing a circuit from positive supply line 222, line 233, contact 249, contact 130, relay magnet 247, to the common return wire C. The magnet 247 cannot be deenergized until the circuit is broken by contact 130 which happens at each revolution of cam 113. If at the completion of the first revolution the required number of impulses, as set upon the control unit, has not been completed, the contact 210 will still be closed and the cam 113 will continue on another revolution.

The setting back of the system is accomplished by stopping the entire system, with the exception of the emitter, for a time equivalent to the amount it is desired to set the system back. This is accomplished by pulling outwardly the knob 154' (Fig. 1) of the "set back control" and turning counterclockwise until the indicator corresponds to the amount as shown on its corresponding dial equivalent to the number of minutes desired to set the system back. For example, let it be assumed that the system is to be set back 15 minutes. The indicator 171 on the "set back control" unit is set to correspond to 15 on the dial. The turning back of this control causes the contact 169 (Figs. 7 and 15) to close which causes relay magnet 214 (Fig. 15) to become energized by the completion of a circuit from positive supply line 222, contact 169, relay magnet 214 to the negative supply line 218.

The energization of relay magnet 214 causes contacts 215 to close and contacts 216 to open. The opening of contact 216, opens the common return circuit for the system stopping all secondary units as well as the "master control unit". The closing of contact 215 establishes a circuit through the drive magnet 137' whereby said magnet receives minute impulses from the relay contacts 223 operated by the emitter as previously explained. This circuit is from positive supply line 222, line 221, relay contact 223, line 225, contact 213, line 226, contact 215, drive magnet 137' to negative supply line 218. The set back control is thus stepped back towards zero at its home position by minute impulses requiring 15 such impulses to bring it back to its zero position from its set position at 15. Upon its arrival at its zero position at the break of the 15th impulse, contact 169 is opened restoring contact 215 to its normally opened position and contact 216 to its normally closed position thereby putting the system in a position to receive the next succeeding minute impulse.

While the fundamental novel features of the invention as applied to a single modification has been shown, described and pointed out, it will be understood that various omissions, substitutions and changes in the form and details of the device illustrated and in its operation may be made by those skilled in the art without departing from the spirit of the invention. The applicant intends to be limited therefore only as indicated by the scope of the following claims:

1. In a clock system, in combination, a master clock including continuously operating accurate timekeeping elements and means controlled by the same for constantly initiating accurately timed electrical impulses, one or more time controlled secondary units, circuits connecting said impulse initiating means with said secondary units to advance the latter under control of the accurately timed electrical impulses, and pre-settable means for sending impulses over said circuits at a more rapid rate than that of the accurately timed impulses to advance the secondary units an amount in accordance with the setting on the pre-settable means, whereby the secondary units may be advanced selected amounts without affecting the accurate timing of the impulses from the master clock.

2. In a synchronizing clock system in combination with master control mechanisms and one or more time controlled secondary units, circuits connecting said master control mechanisms and secondary units, said circuits comprising in part a pair of conductors over certain of which normal and rapid impulses may be sent by said master control mechanisms, said master control mechanisms including a clock for sending out regular and constant impulses, means controlled by said normal impulses for selecting which of the certain conductors shall transmit the regular and constant impulses, and means controlled by said last named means for sending out impulses at a more rapid rate than said regular and constant impulses.

3. A synchronizing clock system including master control mechanisms, time controlled secondary units and circuits comprising in part two conductors connecting said master control mechanisms with said time controlled secondary units, characterized in that the master control mechanisms comprise timed control means for sending out regular and constant impulses over said conductors, and an additional control device driven by said regular and constant impulses for determining whether one or both of said conductors shall receive said regular and constant impulses at certain chronological positions of said control device.

4. A synchronizing clock system including master control mechanisms and time controlled secondary units and circuits comprising in part two conductors connecting said master control mechanisms with said time controlled secondary units, characterized in that said master control mechanisms include timed control means for sending out constant and regular impulses over said conductors, a second control device driven by said regular and constant impulses for determining whether one or both of said two conductors shall receive said regular and constant impulses at certain chronological positions of said control device and a third motor operated device controlled by the chronological position of said second control device for sending out impulses at a more rapid rate than the regular and constant impulses.

5. A synchronizing clock system including master control mechanisms and timed control secondary units and circuits comprising in part two conductors connecting said master control mechanisms with said time controlled secondary units, characterized in that said master control mechanisms include a continuously operated clock mechanism for sending out regular and constant impulses over said conductors and a control device operated by said clock mechanism for determining which of said conductors shall receive said regular and constant impulses according to the chronological position of said control device and means for retarding or advancing said control device relative to said clock mechanisms.

6. A synchronizing clock system including master control mechanisms, time controlled secondary units and circuits connecting said master control mechanisms and said secondary units, characterized in that said master control mechanisms include a continuously operating accurate clock mechanism for sending out constant and regular impulses to advance said secondary units, and an additional motor driven impulse emitting device adapted to send out impulses to said secondary units at a more rapid rate than the constant and regular impulses and pre-settable means for initiating the operation of said motor drive impulse emitting device whereby said secondary units are automatically advanced a predetermined amount in accordance with said pre-settable means.

LAURENCE S. HARRISON.